July 20, 1965  M. H. PELAVIN ETAL  3,196,449
APPARATUS FOR PROVIDING A SERIES OF SIMULTANEOUSLY
RECORDED GROUPS OF TEST RESULT RECORDS
Filed July 30, 1963

INVENTORS:
MILTON H. PELAVIN
WILLIAM J. SMYTHE
BY

ATTORNEY 3,196,449
APPARATUS FOR PROVIDING A SERIES OF SIMULTANEOUSLY RECORDED GROUPS OF TEST RESULT RECORDS
Milton H. Pelavin, Greenburgh, N.Y. (25 Lark Ave., White Plains, N.Y.), and William J. Smythe, 430 Park Ave., Rye, N.Y.
Filed July 30, 1963, Ser. No. 298,762
13 Claims. (Cl. 346—34)

This invention relates to a method and apparatus for the provision of a series of simultaneously recorded groups of test result records from alternating groups of a plurality of testing means, and has for a primary object the provision of separate and readily identifiable groups of records of this nature whereby the said records may be conveniently and accurately identified and interpreted.

A further object of the invention is the provision of a series of spaced groups of records as above on a recording means which comprises a single recording chart.

Another object of the invention is the provision of a method and apparatus as above which make possible substantially maximum utilization of available result recording time by recording only the most meaningful portions of the said test results.

Another object of the invention is the provision of apparatus as above employing only relatively inexpensive components of proven dependability whereby manufacturing and maintenance costs are minimized.

A further object of the invention is the provision of apparatus as above embodying significant versatility in the design thereof whereby the apparatus is readily adaptable for use in conjunction with testing apparatus operatively arranged in a wide variety of manners.

A still further object of the invention is the provision of method and apparatus as above which are peculiarly, though not exclusively, adaptable for use in the multi-pen recording on a single recording chart of the results from automatic blood sample supply and analysis apparatus of the nature disclosed, for example, in U.S. Patent No. 2,899,280, issued August 11, 1959, for E. C. Whitehead et al., and assigned to the assignee hereof.

In a preferred embodiment herein disclosed, the apparatus of the invention comprises a multi-pen, variable speed chart recorder. A plurality of automatic blood analysis apparatus, of greater overall number than the number of recording pens, are arranged for sequential connection, in alternate simultaneous groups of less than the overall number thereof, to the recording pens. Discreet blood samples are supplied in a continuous stream to the analysis apparatus from connected blood sample supply apparatus. Analysis apparatus-recorder pen switching means, and recorder chart speed control means, operative in response to timer activated control circuits, are provided to control the sequential connections of the analysis apparatus groups to the recorder pens, and the speed of the recorder chart, whereby a plurality of separate and readily identifiable blood sample analysis results curves may be provided on the recording chart and the blood type of the respective blood samples determined therefrom.

The above and other objects and advantages of the invention are believed made clear by the following detailed description taken in conjunction with the accompanying drawings wherein.

Figure 1:
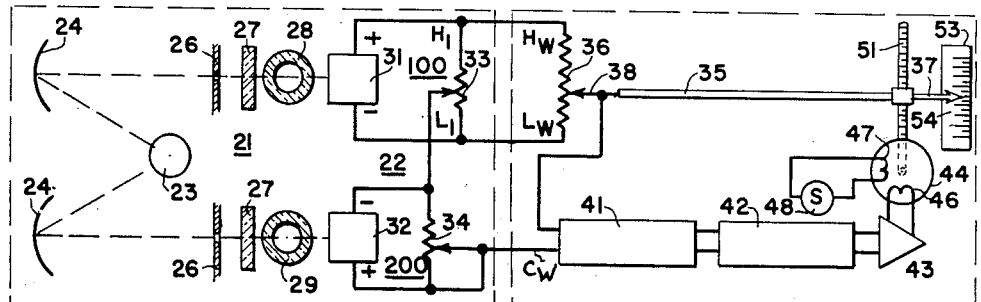
FIG. 1 is a combined schematic and block diagram of exemplary, interconnected colorimetric analysis and recording apparatus.

Referring now to FIG. 1, operatively interconnected colorimetric analysis and recorder apparatus are generally indicated at 1 and W, respectively. The depicted interconnected analysis-recorder apparatus is of a type well known in this art, and is intended as only illustrative of a form of apparatus particularly adaptable for use in an analysis-recording system constructed in accordance with the teachings of the invention. Employed in the said apparatus are a plurality of photoelectric devices in a balancing system of the nature wherein a slide wire is operated for balancing a null-type measuring circuit and wherein a recording is made of the movements of a movable tap attached to the slide wire. Apparatus of this general nature are described in detail, for example, in U.S. Patents 2,960,910 and 3,031,917, issued November 22, 1960, and May 1, 1962, respectively, to M. H. Pelavin—a co-inventor of the subject method and apparatus—and assigned to the assignee hereof. Briefly described, the colorimetric analysis apparatus, or colorimeter, comprises an optical system generally indicated at 21 and a light-responsive electrical system, generally indicated at 22, operatively associated therewith. The said optical system in turn comprises a single light source 23, concave mirrors 24, apertured light shields 26, suitable optical filters 27, a standard or reference flow cell 28, and a sample flow cell 29, relatively positioned as shown, whereby light from the said source may be focused in relatively well defined beams on both the reference and sample flow cells in a manner well known in this art.

The light-responsive electrical system 22 in turn comprises photoelectric devices 31 and 32 positioned in the paths of the said light beams and electrically connected as shown in series opposition with photoelectric device 31 feeding loop 100 and photoelectric device 32 feeding loop 200. Slide wire potentiometers 33 and 34 are connected, respectively, in the two loops whereby the output of photoelectric device 31 will be developed across potentiometer 33 and the output of photoelectric device 32 will be developed across potentiometer 34.

Included in the recorder apparatus is a slide wire potentiometer 36, connected as shown to loop 100 by the interconnections of leads $H_1$ and $H_w$ and $L_1$ and $L_w$, respectively. A recording stylus 37 is mechanically connected by member 35 to tap 38 of potentiometer 36 whereby the stylus and tap will move in unison. Further included in the recorder apparatus is a converter 41, transformer 42, amplifier 43, and two-phase motor 44, interconnected as shown in a conventional manner between potentiometers 34 and 36. Motor 44 includes two windings, 46 and 47, respectively, with the former connected to the output side of amplifier 43 and the latter to an A.C. source 48. Motor shaft 51 extends from the motor and is cooperatively associated with the member 35 in the depicted conventional manner whereby rotation of the shaft will function to move the recording stylus 37 and tap 38 to a corresponding extent in a direction determined by the direction of rotation of the said shaft. A recording means 53, including a driven recording chart 54, is positioned adjacent the stylus so that movement of the stylus in response to rotation of the motor shaft may be recorded on the said recording chart. The operation of the depicted colorimetric analysis-recorder apparatus is conventional and further explained in detail in the Pelavin patents, Nos. 2,960,910 and 3,031,917, referred to hereinabove. Suffice for present purposes to set forth that the record made on the recording chart 54 by the movement of the recording stylus 37 relative thereto represents the relationship between the intensity of light from source 23 transmitted through the reference flow cell 28 to the photoelectric device 31, and the intensity of light from the same source transmitted through the sample flow cell 29 to photoelectric device 32. The intensity of light transmitted in this nature is known as transmission (TR) and is commonly expressed in percent, whereby the quantity of a particular substance (as evidenced by color concentration) in a chemically treated sample introduced to the sample flow cell may be determined from proper interpretation of the record made by the stylus on the recording chart. Attention is here directed to the said U.S. Patent No. 2,899,280, referred to hereinabove, wherein is believed made clear the manner in which colorimetric analyses of this general nature are particularly adaptable to the analysis of blood samples in the determination of the quantities of various substances contained therein. It is, however, reiterated here that the depicted colorimetric analysis-recorder apparatus is intended as illustrative, only, and that other analysis apparatus, as for example spectral flame analysis apparatus of the nature disclosed in U.S. Patent No. 3,031,915, issued May 1, 1962, to M. H. Pelavin and assigned to the assignee hereof, are equally adaptable to combination with recorder apparatus of the depicted nature in apparatus constructed in accordance with the invention.

Figure 2:
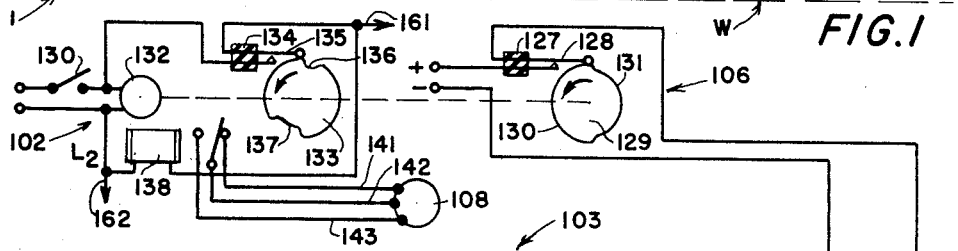
FIG. 2 is a combined schematic and block diagram of the apparatus of the herein-disclosed preferred embodiment of the invention.
Figure 2:
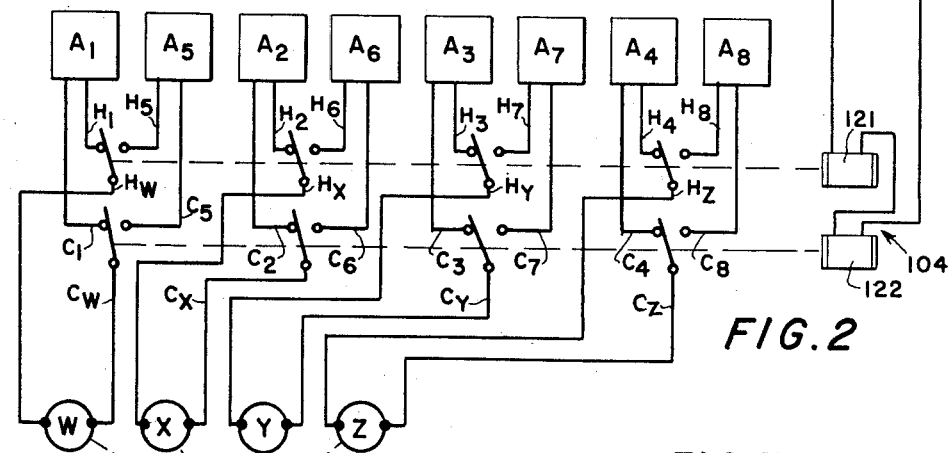

Referring now to FIG. 2, the analysis-recording apparatus of the invention is seen to comprise a four channel, variable speed chart recorder generally indicated at 101, a timer activated control circuit for controlling the speed of the recorder chart drive motor generally indicated at 102, a plurality of automatic analysis apparatus generally indicated at 103, switching means for sequentially connecting predetermined groups of the analysis apparatus simultaneously to the recorder generally indicated at 104, and a timer activated control circuit for controlling the operation of the switching means generally indicated at 106.

In the herein disclosed preferred embodiment, eight separate analysis apparatus are utilized and identified in the drawing as $A_1$-$A_8$, respectively. It is to be understood, however, that a lesser or greater number of such apparatus could be employed in the system of the invention without necessitating other than relatively minor changes in the arrangement of the switching means of a nature made clearer hereinbelow. Similarly, more or less recorder channels might be used without necessitating other than relatively minor changes in the arrangement of the switching means.

For convenience of description, and although not essential as set forth above, each of the said analysis apparatus will be considered a colorimeter connectible to the circuits of the recorder channels in the manner of the basic colorimeter and recorder circuits of FIG. 1. Thus, the said analysis apparatus will each have three leads, i.e., and H, L, and a C lead, extending therefrom for operative connection to the corresponding H, L, and C leads of a recorder channel. These leads are commonly referred to as the high, low, and converter leads, respectively, and will be so referred to hereinbelow. In accordance with the teachings of this embodiment of the invention, the colorimeters $A_1$-$A_8$ are arranged in two groups, with colorimeters $A_1$-$A_4$ constituting a first group and colorimeters $A_5$-$A_8$, a second group. It is the overall function of the method and apparatus of the invention to simultaneously connect electrically the four colorimeters of the first group to the four recorder channels for a predetermined period of time, at the expiration of which the said colorimeters are disconnected and the colorimeters of the second group simultaneously connected electrically in the same manner to the recorder channels. The process is continuous, with the recorder channels being switched repeatedly back and forth, at predetermined timed intervals, between the colorimeters of the first and second group until the completion of an analysis and recording operation. The said electrical connections are made by connecting the high, low, and converter leads of the colorimeter circuits to the corresponding high, low, and converter leads of the recorder channel circuits in the manner made clear for the connection of one pair of such circuits in FIG. 1. Since it is not necessary to electrically connect and disconnect the corresponding low leads of the colorimeter and recorder channel circuits every time the switching function is performed, a non-illustrated common low lead is provided for all the colorimeter and recorder channel circuits.

Turning now in greater detail to the four channel recorder generally indicated at 101, it will be seen to comprise a driven recording chart 107 and four pens 110, 111, 112 and 113 cooperatively associated therewith. The chart is driven at varying speed by two speed motor 108 under the control of motor control circuit 102 in a manner set forth in detail hereinbelow. Circles W through Z are used in the drawings to diagrammatically illustrate the four separate recorder channel circuits required for the control of the pens. Each of these circuits is of the nature depicted at W in FIG. 1 and functions as in the manner set forth hereinabove to control the movement of an operatively associated pen relative to the recording chart; with the recorder circuit W (FIG. 2) controlling pen 110, circuit X controlling pen 111, circuit Y pen 112, and circuit Z pen 113. Thus in essence are provided four individual recorders arranged to simultaneously record the results of four separate colorimetric analyses on the same recording chart. To this effect, and to prevent overlapping of result recordings, the pens are arranged in the depicted predetermined spaced-apart manner described in detail hereinbelow.

Referring now to the switching means 104 and the switching means control circuit 106, two relays 121 and 122, respectively, are electrically connected in the latter to control the operation of the former. For convenience of description, two four pole, double throw relays are depicted. It is to be understood, however, that a single, eight pole relay or eight, single pole relays might be substituted therefor if desired. As shown, the relays are connected in series in the control circuit 106 for simultaneous energization and de-energization thereby. The high leads of the colorimeter and recorder channel circuits are electrically connected, as shown, to the contacts of relay 121 in such manner that the alternate connections between the high leads $H_1$-$H_4$ of colorimeters $A_1$-$A_4$, and the high leads $H_5$-$H_8$ of colorimeters $A_5$-$A_8$, with the high leads $H_w$-$H_z$ of recorder channels W-Z, are simultaneously controlled by the energization and de-energization of the said relay. Similarly, the converter leads of the respective colorimeters and recorder channels are electrically connected, as shown, to the contacts of relay 122 in such manner that the alternate connections between the converter leads $C_1$-$C_4$ of the colorimeters $A_1$-$A_4$, and the converter leads $C_5$-$C_8$ of colorimeters $A_5$-$A_8$, with the converter leads $C_w$-$C_z$ of recorder channels W-Z, are simultaneously controlled by the energization and de-energization of this relay. Thus, in a first condition of the relays—for example, the depicted de-energized condition—colorimeter high leads $H_1$-$H_4$ and colorimeter converter leads $C_1$-$C_4$ will be connected, respectively, across the contacts of the relays 121 and 122 to the high and converter leads $H_w$-$H_z$ and $C_w$-$C_z$, respectively, of recorder channels W-Z, whereby the first group of colorimeters $A_1$-$A_4$ will be operatively connected simultaneously to the four recorder channels to enable the simultaneous recording of the analysis results therefrom by the recording pens 110-113 on the recording chart 107.

Alternatively, with the relays 121 and 122 energized through circuit 106, the connections will be reversed, with the high leads $H_5$-$H_8$ and the converter leads $C_5$-$C_8$ of colorimeters $A_5$-$A_8$ now connected simultaneously across the contacts of the relays to the high and converter leads of the recorder channels, whereby the record produced by the recording pens will represent the simultaneous analysis results from colorimeters $A_5$–$A_8$. Thus may be seen wherein alternate energization and de-energization of the relays 121 and 122 for predetermined periods of time will function to alternately connect the first and second colorimeter groups to the recorder channels for corresponding periods of time.

The simultaneous energization and de-energization of the relays 121 and 122 for the above-mentioned predetermined periods of time is carried by the control circuit 106 in which the said relays are connected in series. To this effect, the said circuit includes a normally closed switch 127 with actuator arm 128 projecting therefrom. A timing cam 129 is operatively associated with the actuator arm and driven to rotate relative thereto by a constant speed timing motor 132. The periphery of the said cam is preferably, but not necessarily, equally divided into a high side 130 and a low side 131, and positioned as shown relative to the switch actuator so that the said switch will be open (as depicted) when the actuator rides on the high side 130, and closed when the actuator rides on the low side 131. Thus, the circuit 106 will be alternately completed, to energize the relays, and opened, to de-energize the relays, for corresponding periods of time, by the opening and closing of switch 127 as the timing cam 129 is rotated at constant speed relative to the switch actuator 128 by the constant speed timing motor 132.

Assuming the timing cam to be initially positioned as shown with the actuator 128 just on the verge of falling from the high side 130 to the low side 131, and the speed of the cam to be one revolution every two minutes, it may thus be understood whereby upon activation of the driving motor 132 to commence rotation of the cam, colorimeters $A_5$–$A_8$ will be connected through the contacts of relays 121 and 122 to recorder channels W–Z as the relays are in turn energized by the closing of switch 127. At the expiration of one minute, however, the high side 130 of the cam will again be presented to the switch actuator 128 whereupon the switch 127 will be opened and the relays de-energized to now connect colorimeters $A_1$–$A_4$ through the relay contacts to the recorder channels. This alternate connection of the colorimeters to the relay channels in simultaneous groups of four for one minute each will, of course, continue for so long as the timing motor 132 remains activated. A switch 130 is provided to activate the timing motor at the commencement of an analysis operation.

As mentioned above, the recorder 101 comprises a recording chart 107 driven at varying speed by two speed drive motor 108, the operation of which is controlled by timer activated control circuit 102. To this effect, a normally closed switch 134, with switch actuator 135 projecting therefrom, is included in the said circuit and a timing cam 133 operatively positioned relative to the said actuator in the manner of timing cam 129 and switch actuator 128 of control circuit 106. Timing cam 133 is also driven at constant speed by the timing motor 132, and includes the two notches 136 and 137 formed in the periphery thereof. The cam and switch actuator are so arranged that the switch will be closed only when the actuator rides in one of the said notches. Notch 137 is preferably, but not necessarily, of twice the peripheral extent of notch 136 whereby the switch actuator 135 will take twice as long to traverse notch 137 as to traverse notch 136. A single pole, double throw relay 138 is connected as shown in the control circuit 102 and energized thereby only when the switch actuator 135 rides within one of the notches 136 or 137 to close switch 134 and complete the circuit. Two speed, recording chart drive motor 108 includes three leads 141, 142 and 143, hereinafter referred to for convenience of description as the slow, common and fast leads, respectively. These leads are connected as shown to the contacts of relay 138 whereby the said motor will run at slow speed with the slow and common leads connected through the contacts of the de-energized (as depicted) relay 138, and at fast speed with the fast and common leads connected through the contacts of relay 138 upon the energization thereof by the control circuit 102. Thus, the recording chart will be driven by motor 108 at a relatively slow or "recording" speed, whenever switch actuator 135 rides on the un-notched periphery of timing cam 133 and the switch 134 is maintained open thereby; and at a relatively fast or "spacing" speed whenever the said actuator falls within either of cam notches 136 or 137 to close the switch 134 and complete the control circuit to energize relay 138. Leads 161 and 162 are connected across control circuit 102 as shown to supply power to correspondingly identified leads of a pen lifting device 145 which is included in the recorder 101 and operative, when activated, to lift pens 110–113 from the surface of the recording chart 107. Thus, the said pen lifting device will be activated, and the pens lifted thereby from the recording chart, only when the control circuit 102 is completed through the closing of switch 134, and the motor 108 energized thereby to drive the recording chart 107 at the relatively fast or "spacing" speed.

Referring now in greater detail to the recording chart 107, a plurality of groups of exemplary curves 150, 151, and 152, respectively, spaced as shown, will be seen to be formed thereon by the relative movement between the pens 110–113 and the driven recording chart. These curves, of course, represent the results of the analysis performed in the colorimeters $A_1$–$A_8$ and, as such, represent the overall result of the operation of the apparatus of the invention. As set forth hereinabove, a primary object of the invention is the provision of these groups of curves in the depicted spaced apart manner with no overlapping between adjacent curves of the same group, and a larger space between adjacent groups of curves than between curves of the same group, whereby the interpretation of the curves and the analysis results represented thereby may be effected in a manner embodying greater convenience and less chance for error than has heretofore been possible in the simultaneous recording of a plurality of analysis results on the same recording chart. Also, as set forth hereinabove, the apparatus of the invention is particularly adaptable for use in the recording of results from the automatic multiple analysis of blood samples in conjunction with automatic blood sample supply and analysis apparatus of the general nature disclosed in U.S. Patents Nos. 2,797,149, 2,879,141 and 3,038,340. Very briefly described, such apparatus functions by alternately withdrawing samples of blood and slugs of wash liquid from suitable receptacles and supplying the resultant continuous stream of discreet blood samples separated by slugs of wash liquid to suitable chemical processing apparatus wherein the blood is treated to make possible the automatic analysis thereof, for example as to type, as in colorimeters $A_1$–$A_8$. Since, in the present case, blood from the same sample is to be analyzed for different substances contained therein in eight distinct analysis apparatus, the said sample must be broken down into eight portions, each of which is chemically treated in a manner consistent with the nature of the analysis to be performed thereon, and in turn supplied to a different one of the eight analysis apparatus for automatic analysis therewithin. In accordance with the teachings of the herein-disclosed preferred embodiment of our invention, the eight sample portions would be combined into two groups of four each, with the chemically processed portions of the first group supplied simultaneously to colorimeters $A_1$–$A_4$, each to a different colorimeter, and the chemically processed portions of the second group supplied in a similar manner, after a predetermined time delay, to colorimeters $A_5$–$A_8$. Thus, for example, curves 151a would represent the results of the simultaneous colorimetric analysis within colorimeters $A_1$–$A_4$ on a first group of four sample portions from the same blood sample, and the curves 151b, the results of the simultaneous colorimetric analysis within colorimeters $A_5$–$A_8$ on the second group of four portions of the same sample. Similarly, the spaced curves 150a and 150b of curve group 150 would represent the results of the same analyses performed on a preceding sample, and the curves 152a the results of the same analyses on the first four portions of a succeeding sample.

The determining factors to be considered in providing non-overlapped groups of curves in the depicted spaced-apart manner with greater spacing between groups of curves representing analysis results on different samples than between curves representing analysis results on the same sample, are as follows: pen spacing, pen lifting timing cycle, recorder chart "recording" speed, sampling time (the time required for the supply of portions of one blood sample to all eight of the analysis apparatus), and the timing cycles of both the switching means by which the groups of colorimeters are alternately switched into contact with the four recorder channels, and the switching means by which the two speed, recorder chart drive motor is switched back and forth between the "recording" and "spacing" speeds thereof.

For purposes of illustration only, and not by way of limitation, consistent exemplary values will be assigned to these determining factors in the description of the overall manner of operation of the apparatus of the invention whereby a more complete understanding may be had thereof.

Assuming a sampling time of two minutes, i.e. the supply for analysis of thirty samples per hour to the colorimeters $A_1$–$A_8$, and a recorder chart "recording" or slow speed of three quarters of an inch per minute, the remainder of the said factors will be seen to take the following values in order to furnish the desired results. Since only two minutes are available for the recording of the analysis results from each sample, this time must be divided between the two groups of colorimeters, i.e. $A_1$–$A_4$ and $A_5$–$A_8$, insofar as the length of time each such group of colorimeters is connected to the recorder channels W–Z for each sample. Preferably, but not necessarily, this time is proportioned equally with each of the said colorimeter groups operatively connected to the recorder channels for one minute for each sample. Thus, timing cam 129 which controls the switching of the colorimeter groups must be rotated by timing motor 132 at a speed of one half revolution per minute whereby the 180° extent high side 130 of the cam will maintain switch 127 open and colorimeters $A_1$–$A_4$ connected to recorder channels W–Z for one minute, and the 180° extent low side 131 of the cam will enable the said switch to close to in turn connect the colorimeters $A_5$–$A_8$ to the said recorder channels for the following minute. Thus, each group of colorimeters will be connected to the recorder for only one of the two minutes made available for the analysis of each blood sample portion by the flow of the said portion through the colorimeter flow cell. Since the result curve for each blood sample portion obtained by way of the recorder does not come immediately to its meaningful maximum or peaked value, but, rather, commences and terminates at relatively meaningless values in the range of 100% light transmittance as made clear, for example, in U.S. Patent No. 2,899,280, issued August 11, 1959 to E. C. Whitehead et al. and assigned to the assignee of this invention, it is not necessary or desirable to record the entire curve since no greater information as to the quantity of the particular substance being analyzed for in the blood sample portion is provided thereby. Thus, by staggering the supply of the two groups of four blood portions from each blood sample to the two groups of colorimeters, and recording only the meaningful peaked portions of the analysis result curves from the said colorimeter groups, the system of the invention makes greater utilization of available analysis results recording time in apparatus which requires only one recorder channel for every two analysis apparatus.

To this effect, and consistent with a two minute sampling time, and a resultant two minute time for each blood sample portion to pass through the flow cells of the colorimeters, there is provided a one-half minute time delay between the time a said portion first enters a colorimeter and the time the said colorimeter is connected to a relay channel. A one minute analysis results recording time follows, at the expiration of which the colorimeter is disconnected from the recorder channel and another half minute elapses while the remainder of the blood sample portion completes its flow through the colorimeter flow cell. A new blood sample portion from the continuous stream thereof referred to hereinabove then enters the colorimeter and the procss is repeated. Thus, a colorimeter is connected to the recorder for analysis results recording during only what might be termed the "middle" minute of the two minute flow of a blood sample therethrough. This is made possible by the fact, as set forth above, that it is only during this "middle" minute that the analysis results curve will reach its meaningful peaked value, which value must of course be recorded to provide meaningful results.

Figure 3:
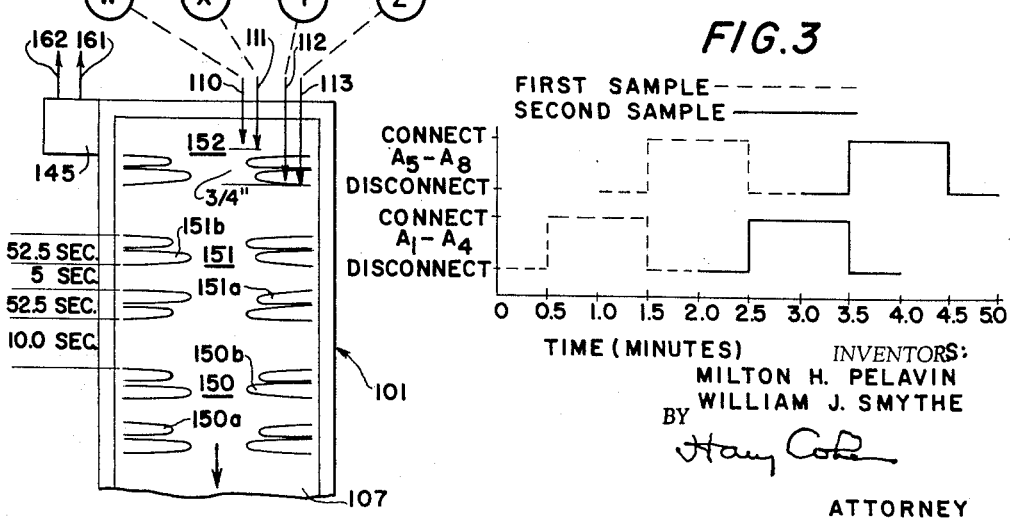
FIG. 3 illustrates graphically the timed operational relationships between the plurality of groups of automatic blood analysis apparatus depicted in FIG. 2.

This timed relationship between the operation of the two groups of colorimeters, $A_1$–$A_4$ and $A_5$–$A_8$, respectively, is graphically represented by FIG. 3 wherein the connect and disconnect points of the two colorimeter groups are plotted against time for the flow of two complete blood samples through the colorimeter flow cells; with the dashed lines in the subject figure indicating the said points for one sample and the solid lines the said points for the next. Thus may be seen wherein the first group of four portions of the first blood sample are introduced to colorimeters $A_1$–$A_4$ and flow therethrough for one half minute before the said colorimeters are connected to the recorder channels. At the expiration of one half minute of recording time of the analysis results from colorimeters $A_1$–$A_4$, the second group of four portions of the first blood sample are introduced to the flow cells of colorimeters $A_5$–$A_8$ to commence flowing therethrough. After the expiration of another half minute, at which time the one minute recording period of the analysis results from colorimeters $A_1$–$A_4$ is completed, the colorimeter groups are switched with colorimeters $A_5$–$A_8$ now connected to the recorder channels to commence the one minute recording period for the second group of portions of the first blood sample now flowing therethrough. During the next half minute, the remainder of the first group of blood sample portions finishes flowing through the now disconnected colorimeters $A_1$–$A_4$. The next half minute sees the introduction of the first group of portions from the second blood sample (as indicated by the solid line) to colorimeters $A_1$–$A_4$, and the completion of the one minute recording period for the second group of portions from the first sample in colorimeters $A_5$–$A_8$. The process is now at the two and one half minute point whereby colorimeters $A_5$–$A_8$ are disconnected and colorimeters $A_1$–$A_4$ again connected to the recorder channels for recording the analysis results from the first group of portions from the second blood sample. At the expiration of the next half minute, the second group of portions from the second sample commences to flow through the flow cells of the now disconnected colorimeters $A_5$–$A_8$ whereby the process is repeated until all the blood samples have been analyzed.

To prevent result curve overlapping with a recorder chart slow or "recording" speed of three quarters of an inch per minute, it becomes necessary to space the pens by three quarters of an inch. It is not necessary, however, to space all pens by this distance since the pens are arranged in groups of two in the recorder to simultaneously trace result curves at opposite sides of the recording chart. Pens 110 and 112 are arranged to trace the two curves of each group on the left hand side of the recording chart, while pens 111 and 113 are arranged to trace the two curves of each group on the right hand side of the said chart. Thus, it becomes necessary only to space pens 110 and 111 from pens 112 and 113, three quarters of an inch in the direction of recorder chart travel as indicated in FIG. 2, whereby overlapping of curves traced by pens on the same side of the said chart is prevented. Additionally, a very small clearance, for example one sixteenth of an inch, in the direction of chart travel is provided to prevent interference between adjacent pens of a group.

For convenience of description in relating the various timing cycles to the result curves on the recording chart, recording and spacing times consistent with a two minute sampling time are indicated in FIG. 2 adjacent the said curves. As indicated thereon, reading from bottom to top in the direction of time, the first ten second interval would occur during the travel of actuator 135 of switch 134 within notch 137 of timing cam 133. Thus, notch 137 must be of the 30° extent necessary to maintain the said actuator therein for 10 seconds at the one half revolution per minute rotational rate of timing cam 133. With the actuator 135 positioned within notch 137, control circuit 102 is completed whereby relay 138 is energized to shift chart drive motor 108 to the fast or "spacing" speed. The pen lifters 145 are actuated simultaneously therewith through leads 161 and 162, whereby the pens are lifted from the recording chart and the chart driven at "spacing" speed for ten seconds to provide a relatively large space between groups of results curves 150 and 151, respectively, relating to different blood samples. As notch 137 completes its travel relative to switch actuator 135, the high side 130 of timing cam 129 is just being presented to actuator 128 of switch 127 whereby control circuit 106 is opened and the relays 121 and 122 de-energized to connect colorimeters $A_1$–$A_4$ to the four pens 110–113 through the corresponding recorder channels W–Z, respectively. Thus, as soon as notch 137 passes completely below actuator 135 and the un-notched periphery of timing cam 133 is presented to the latter, control circuit 102 is opened to return recording chart drive motor 132 to the slow or "recording" speed thereof and de-activate the pen lifters, whereby the pens are returned to contact with the chart now moving at "recording" speed and the results of the analysis in the now connected colorimeters $A_1$–$A_4$ commenced to be recorded thereon as the first four curves 151a of group 151. At the expiration of fifty-two and a half seconds from this point, timing cam 133 will have rotated sufficiently to present notch 136, which is of half the peripheral extent of notch 137, to actuator 135 of switch 134, whereby control circuit 102 will again be closed. Thus, the chart drive motor 108 will again be shifted to fast or "spacing" speed, and the pens lifted from contact with the recording chart. This simultaneous "spacing" speed drive of the said chart and lifting of the pens therefrom for five seconds, provides the space between curves 151a and 151b of group 151. Additionally, while actuator 135 is within notch 136, the low side 131 of timing cam 129 will be presented to actuator 128 of switch 127 to close control circuit 106 and energize relays 121 and 122. This of course results in the switching, through the relay contacts, of colorimeters $A_5$–$A_8$ into contact with the recorder channels W–Z to control the movements of the now lifted pens 110–113. However, as the notch 136 completes its travel beneath the actuator 135, the un-notched periphery of timing cam 133 is once again presented thereto to reopen control circuit 102. This reshifts the chart drive motor 108 to slow or "recording" speed and de-activates the pen lifters whereby the pens, which are now under the control of colorimeters $A_5$–$A_8$, are returned to contact with the recording chart and the results of the analysis in the said colorimeters recorded thereon for fifty-two and a half seconds in the form of the curves 151b of group 151. At the expiration of this last-mentioned period of time, notch 137 is again presented to actuator 135 of switch 134 to once again complete control circuit 102 whereby the process will be repeated in the above-described manner to form the spaced, result curve groups for each sample until the completion of the analyses of all blood samples supplied to the apparatus of the invention. The curves 151a of group 151 of course represent the analysis results from colorimeters $A_1$–$A_4$ of a first group of four portions from a blood sample, while the curves 151b of group 151 represent the analysis results from colorimeters $A_5$–$A_8$ from a second group of four portions from the same blood sample. The total elapsed time for the recording and spacing of the analysis results curves for one complete blood sample, i.e., curves 151a and 151b of curve group 151, will be seen to equal two minutes and to thus be perfectly consistent with a two minute sampling time.

While we have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Apparatus comprising, a plurality of groups of testing means, recording means including a plurality of simultaneously operable recording devices operatively connectible to said testing means groups for recording test results therefrom on a moving, record receiving member, the number of testing means in each of said groups being equal to the number of recording devices, switching means operable to alternately connect the said testing means groups to the said recording devices in one-to-one testing means-recording device correspondence to provide a series of simultaneously recorded groups of test result records from said testing means groups on said record receiving member, spacing means operable to intermittently de-activate said recording devices to space the said groups of test result records on the moving, record receiving member to separate the same thereon, and controlling means operable to intermittently actuate said switching and spacing means.

2. Apparatus as in claim 1, wherein said moving, record receiving member comprises a motor driven recording chart, and said spacing means comprise a variable speed recording chart drive motor shiftable between recording and spacing speeds and means cooperatively associated therewith for deactivating said recording devices when said recording chart is driven at said spacing speed.

3. Apparatus as in claim 2, wherein the switching means comprise at least one relay and the testing means groups are alternately connectible to the recording means across the relay contacts, with a first testing means group connected to the recording means when the relay is energized, and a second testing means group connected to the recording means when the relay is deenergized.

4. Apparatus as in claim 3, wherein the controlling means comprise first and second timing circuits, with said first timing circuit operable to alternately shift said recorder chart drive motor between recording and spacing speeds and deactivate said recording devices substantially simultaneously with the shifting of the chart drive motor to spacing speed, and said second timing circuit operable to alternately energize and de-energize the said relay substantially simultaneously with the said shifting of the recorder chart drive motor speed.

5. Apparatus as in claim 4, wherein said controlling means further comprise a timing motor, and first and second timing cams driven thereby and operatively associated, respectively, with said first and second timing circuits, said testing means comprising quantitative analysis apparatus for the quantitative analysis of substances supplied thereto with respect to predetermined constituents thereof.

6. Apparatus as in claim 4, wherein said controlling means further comprise a timing motor, and first and second timing cams driven thereby and operatively associated, respectively, with said first and second timing circuits.

7. Apparatus as in claim 1, wherein the switching means comprise at least one relay and the testing means groups are alternately connectible to the recording means across the relay contacts, with a first testing means group connected to the recording means when the relay is energized, and a second testing means group connected to the recording means when the relay is de-energized.

8. Apparatus as in claim 1, wherein said controlling means comprise a timing motor, first and second timing cams driven thereby and first and second timing circuits operable, respectively, by said first and second timing cams, with said first timing circuit operable to control the spacing means and said second timing circuit operable to control the switching means.

9. Analysis and recording apparatus for the automatic typing of blood comprising, a plurality of groups of automatic analysis apparatus for the quantitative analysis of chemically treated portions of discrete blood samples supplied thereto in a continuous stream, a chart recorder including a plurality of simultaneously operable recording pens operatively connectible thereto for the recording of analysis results therefrom on a moving recorder chart, the number of analysis apparatus in each of said groups being equal to the number of recording pens, switching means operable to alternately connect the said groups in one-to-one analysis apparatus-recording pen correspondence to the said recorder to provide a series of simultaneously recorded groups of blood sample analysis result records from said analysis apparatus on the recorder chart, spacing means operable to intermittently deactivate said recording pens to space the said groups of blood sample analysis result records on the moving recorder chart to separate the same thereon, and controlling means operable to intermittently actuate said switching and spacing means.

10. Apparatus as in claim 9, wherein said spacing means comprise a variable speed recorder chart drive motor shiftable between recording and spacing speeds, and pen lifting means operable to lift said pens from said recording chart when said drive motor is shifted to spacing speed.

11. Apparatus as in claim 10, wherein said switching means comprise at least one relay and the analysis apparatus groups are alternately connectible to the recorder across the relay contacts, with a first analysis apparatus group connected to the recorder when the relay is energized, and a second analysis apparatus group connected to the recorder when the relay is de-energized.

12. Apparatus as in claim 11, wherein the controlling means comprise a timing motor, first and second timing cams driven thereby, first and second timing circuits operable respectively by said first and second timing cams, with said first timing circuit being operable to alternately shift said recorder chart drive motor between recording and spacing speeds and activate said pen lifters to lift said pens from the recording chart substantially simultaneously with the shifting of the chart drive motor to spacing speed, and said second timing circuit being operable to alternately energize and de-energize the said relay substantially simultaneously with the said shifting of the recorder drive chart motor.

13. Apparatus comprising, a plurality of groups of testing means, recording means including a plurality of simultaneously operable recording devices operatively connectible to said testing means groups for recording test results therefrom on a moving, record receiving member, the number of testing means in each of said groups being equal to the number of recording devices, switching means operable to alternately connect the said testing means groups to the said recording devices in one-to-one testing means-recording device correspondence to provide a series of simultaneously recorded groups of test result records from said testing means groups on said record receiving member, spacing means operable to intermittently deactivate said recording devices to space the said groups of test result records on the moving, record receiving member to separate the same thereon, and controlling means operable to intermittently actuate said switching and spacing means, said testing means comprising quantitative analysis apparatus for the quantitative analysis of substances supplied thereto with respect to predetermined constituents thereof.

References Cited by the Examiner
UNITED STATES PATENTS

| | | | |
|---|---|---|---|
| 2,118,081 | 5/38 | Grisdale | 346—34 |
| 2,414,221 | 1/47 | Bristol | 346—137 |
| 2,425,080 | 8/47 | Blakeslee | 346—34 |
| 2,445,272 | 7/48 | Keegan | 346—49 |
| 2,516,217 | 7/50 | Keinath | 346—33 |
| 2,579,831 | 12/51 | Keinath | 346—33 |
| 2,639,964 | 5/53 | Keinath | 346—33 |
| 2,674,513 | 4/54 | Bowditch et al. | 346—46 |
| 2,714,047 | 7/55 | Dehmel | 346—8 |
| 2,743,986 | 5/56 | Bradner | 346—46 |
| 2,818,321 | 12/57 | Searles | 346—34 |
| 2,905,520 | 9/59 | Anderson | 346—34 |
| 2,993,741 | 7/61 | Maltby et al. | 346—34 |
| 3,093,003 | 6/63 | Cochinal et al. | 73—432 |

LEYLAND M. MARTIN, *Primary Examiner.*